(12) United States Patent
Salter et al.

(10) Patent No.: US 9,440,583 B2
(45) Date of Patent: Sep. 13, 2016

(54) VEHICLE DOME LIGHTING SYSTEM WITH PHOTOLUMINESCENT STRUCTURE

(71) Applicant: Ford Global Technologies, LLC, Dearborn, MI (US)

(72) Inventors: Stuart C. Salter, White Lake, MI (US); Jeffrey Singer, Canton, MI (US); Matthew Majkowski, Dearborn, MI (US); Mahendra Somasara Dassanayake, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 431 days.

(21) Appl. No.: 14/156,869

(22) Filed: Jan. 16, 2014

(65) Prior Publication Data

US 2015/0138790 A1    May 21, 2015

Related U.S. Application Data

(63) Continuation-in-part of application No. 14/086,442, filed on Nov. 21, 2013.

(51) Int. Cl.
*B60Q 1/00* (2006.01)
*B60Q 1/26* (2006.01)
*B60Q 3/02* (2006.01)
*B60Q 3/04* (2006.01)

(52) U.S. Cl.
CPC ............ *B60Q 3/0209* (2013.01); *B60Q 3/0279* (2013.01); *B60Q 3/0283* (2013.01); *B60Q 3/044* (2013.01); *B60Q 2500/10* (2013.01)

(58) Field of Classification Search
CPC B60Q 3/0209; B60Q 3/0213; B60Q 3/0279; B60Q 3/0283; B60Q 3/044
USPC .................. 362/487–488, 490, 493, 510
See application file for complete search history.

(56) References Cited

U.S. PATENT DOCUMENTS

| | | | |
|---|---|---|---|
| 5,709,453 A | 1/1998 | Krent et al. | |
| 6,729,738 B2 | 5/2004 | Fuwausa et al. | |
| 6,773,129 B2 | 8/2004 | Anderson, Jr. et al. | |
| 6,851,840 B2 | 2/2005 | Ramamurthy et al. | |
| 6,871,986 B2 | 3/2005 | Yamanaka et al. | |
| 6,990,922 B2 | 1/2006 | Ichikawa et al. | |

(Continued)

FOREIGN PATENT DOCUMENTS

| | | |
|---|---|---|
| CN | 101337492 A | 1/2009 |
| CN | 201169230 Y | 2/2009 |

(Continued)

OTHER PUBLICATIONS

Paulton.org, Lexus IS 250 updated again in Malaysia for 2011, web page, Mar. 26, 2013, 3 pages.

(Continued)

*Primary Examiner* — Jason Moon Han
(74) *Attorney, Agent, or Firm* — Vichit Chea; Price Heneveld LLP (57) ABSTRACT

A vehicle dome lighting system is provided and includes a headliner and a photoluminescent structure coupled to the headliner. At least one excitation source is operable to emit at least one inputted electromagnetic radiation for exciting an associated area of the photoluminescent structure to produce at least one outputted electromagnetic radiation.

18 Claims, 8 Drawing Sheets

(56) References Cited

U.S. PATENT DOCUMENTS

| | | |
|---|---|---|
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,071,988 B2 | 12/2011 | Lee et al. |
| 8,203,260 B2 | 6/2012 | Li et al. |
| 8,286,378 B2 | 10/2012 | Martin et al. |
| 8,408,766 B2 | 4/2013 | Wilson et al. |
| 8,421,811 B2 | 4/2013 | Odland et al. |
| 8,466,438 B2 | 6/2013 | Lambert et al. |
| 8,519,362 B2 | 8/2013 | Labrot et al. |
| 8,606,430 B2 | 12/2013 | Seder et al. |
| 8,624,716 B2 | 1/2014 | Englander |
| 8,631,598 B2 | 1/2014 | Li et al. |
| 8,683,722 B1 | 4/2014 | Cowan |
| 8,724,054 B2 | 5/2014 | Jones |
| 8,773,012 B2 | 7/2014 | Ryu et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0066644 A1 | 4/2004 | Chang |
| 2004/0213088 A1 | 10/2004 | Fuwausa |
| 2006/0087826 A1 | 4/2006 | Anderson, Jr. |
| 2007/0032319 A1 | 2/2007 | Tufte |
| 2007/0285938 A1 | 12/2007 | Palmer et al. |
| 2008/0158510 A1 | 7/2008 | Tant et al. |
| 2009/0219730 A1 | 9/2009 | Syfert et al. |
| 2009/0251920 A1 | 10/2009 | Kino et al. |
| 2011/0180728 A1 | 7/2011 | Sawayanagi |
| 2012/0001406 A1 | 1/2012 | Paxton et al. |
| 2012/0280528 A1 | 11/2012 | Dellock et al. |
| 2013/0335994 A1 | 12/2013 | Mulder et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| DE | 102011120116 | 6/2013 |
| DE | 102011120116 A1 | 6/2013 |
| EP | 1793261 A1 | 6/2007 |
| EP | 2778209 A1 | 9/2014 |
| IN | 2010CH03235 | 7/2011 |
| JP | 2000159011 A | 6/2000 |
| JP | 2009006853 A | 6/2007 |
| JP | 2007238063 A | 9/2007 |
| JP | 2009006853 | 1/2009 |
| WO | 2006047306 A1 | 5/2006 |
| WO | 2014068440 A1 | 5/2014 |

OTHER PUBLICATIONS

Anthony Lim, Lexus IS 250 updated again in Malaysia for 2011, paultan.org, Nov. 29, 2010, Malaysia.

VEHICLE DOME LIGHTING SYSTEM WITH PHOTOLUMINESCENT STRUCTURE

CROSS-REFERENCE TO RELATED APPLICATION

This application is a Continuation-In-Part of U.S. patent application Ser. No. 14/086,442, filed Nov. 21, 2013, and entitled "VEHICLE LIGHTING SYSTEM WITH PHOTOLUMINESCENT STRUCTURE," the entire disclosure of which is incorporated herein by reference.

FIELD OF THE INVENTION

The present invention generally relates to vehicle lighting systems, and more particularly, to vehicle lighting systems employing photoluminescent structures.

BACKGROUND OF THE INVENTION

Illumination arising from photoluminescent structures offers a unique and attractive viewing experience. It is therefore desired to incorporate such photoluminescent structures in a vehicle lighting system to provide ambient and task lighting.

SUMMARY OF THE INVENTION

According to one aspect of the present invention, a vehicle dome lighting system is provided and includes a headliner and a photoluminescent structure contiguously coupled to the headliner. A plurality of excitation sources are each operably coupled to one of a headrest, a b-pillar, and the headliner, and are each operable to emit a primary emission to excite an associated area of the photoluminescent structure. Each associated area is formulated to convert the primary emission into a secondary emission and is located in one of a corner area, a side area, and a central area of the photoluminescent structure such that each associated area at least partially overlaps with at least one adjacent associated area.

According to another aspect of the present invention, a vehicle dome lighting system is provided and includes a headliner and a photoluminescent structure coupled to the headliner. A plurality of excitation sources are each operable to emit at least one of a first inputted electromagnetic radiation, a second inputted electromagnetic radiation, and a third inputted electromagnetic radiation for exciting an associated area of the photoluminescent structure. Each associated area contains a red-emitting photoluminescent material formulated to convert the first inputted electromagnetic radiation into a first outputted electromagnetic radiation, a green-emitting photoluminescent material formulated to convert the second inputted electromagnetic radiation into a second outputted electromagnetic radiation, and a blue-emitting photoluminescent material formulated to convert the third inputted electromagnetic radiation into a third outputted electromagnetic radiation.

According to another aspect of the present invention, a vehicle dome lighting system is provided and includes a headliner and a photoluminescent structure coupled to the headliner. At least one excitation source is operable to emit at least one inputted electromagnetic radiation for exciting an associated area of the photoluminescent structure to produce at least one outputted electromagnetic radiation.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a vehicle lighting system in which a vehicle fixture receives a photoluminescent structure for converting a primary emission into a secondary emission generally having a new color. For purposes of this disclosure, a vehicle fixture refers to any interior or exterior piece of vehicle equipment, or part thereof, suitable for receiving the photoluminescent structure described herein. While the implementation of the vehicle lighting system described herein is primarily directed towards automotive vehicle use, it should be appreciated that the vehicle lighting system may also be implemented in other types of vehicles designed to transport one or more passengers such as, but not limited to, watercrafts, trains, and aircrafts.

Figure 1:
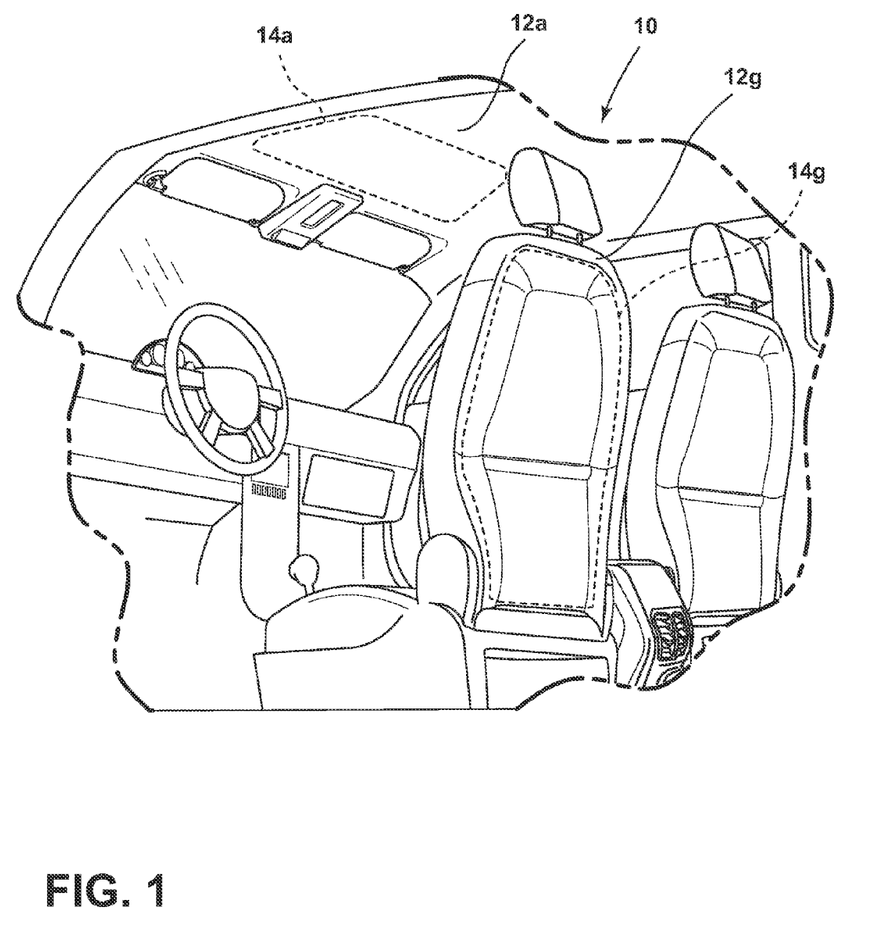
FIG. 1 is a perspective view of a front passenger compartment of an automotive vehicle having various illuminated fixtures.
Figure 2:
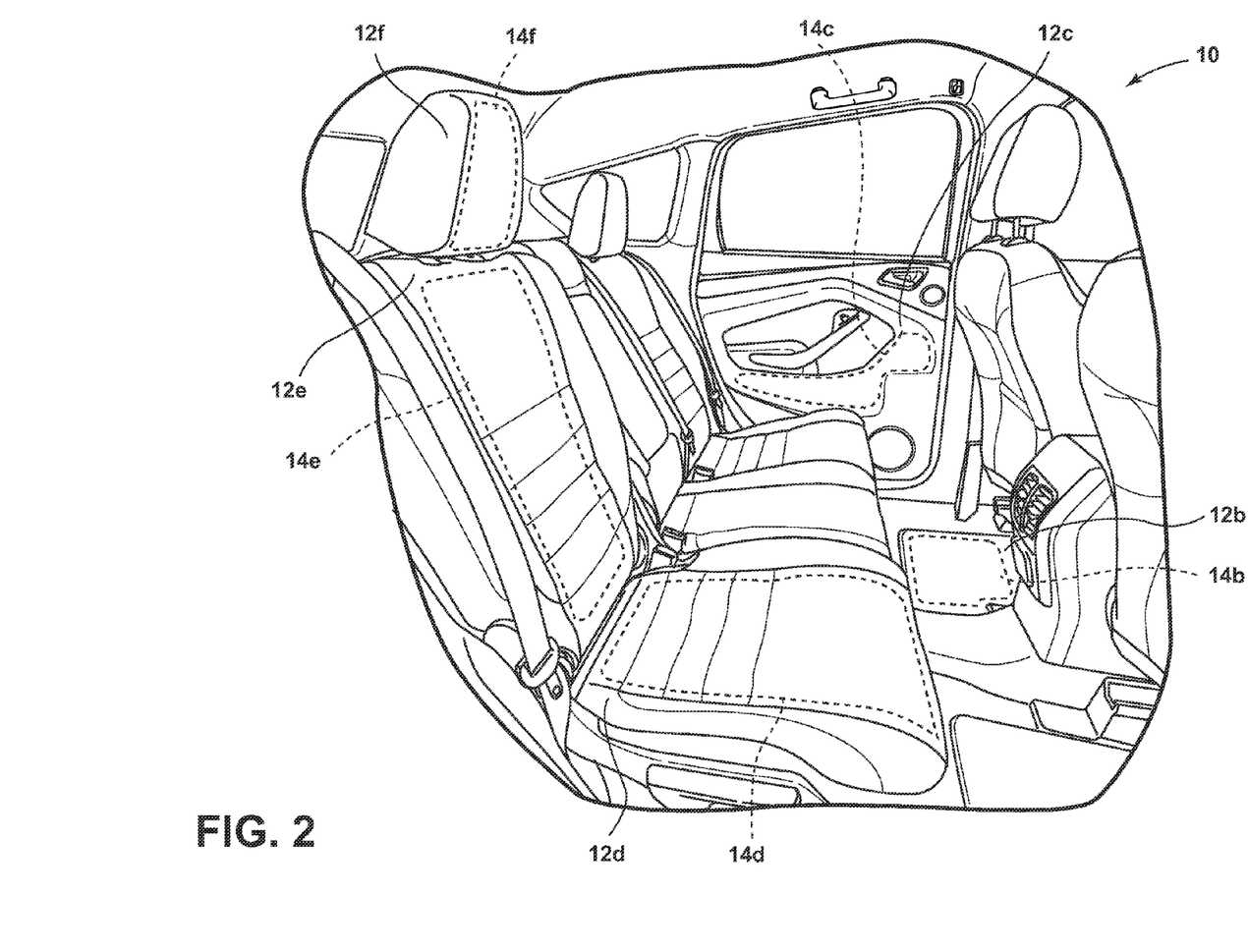
FIG. 2 is a perspective view of a rear passenger compartment of the automotive vehicle having various illuminated fixtures.

Referring to FIGS. 1 and 2, a passenger compartment 10 of an automotive vehicle is generally shown having a variety of exemplary vehicle fixtures 12a-12g located in the front and rear of the passenger compartment 10. The fixtures 12a-12g generally correspond to a headliner, a floor mat, a door trim panel, and various parts of a seat including a seat base, a backrest, a headrest, and a seat back, respectively. For purposes of illustration, and not limitation, each fixture 12a-12g may receive a photoluminescent structure, further described below, on a selected area 14a-14f of each fixture 12a-12f. With respect to the vehicle lighting system described herein, it should be appreciated that the selected area 12a-12f is not limited to any particular shape or size and may include portions of a fixture having planar and/or non-planar configurations. Although some fixtures 12a-12g have been exemplarily provided, it should be appreciated that other fixtures may be used in accordance with the vehicle lighting system described herein. Such fixtures may include instrument panels and components thereon, interactive mechanisms (e.g. push buttons, switches, dials, and the like), indicating devices (e.g. speedometer, tachometer, etc.), printed surfaces, in addition to exterior fixtures such as, but not limited to, keyless entry buttons, badges, side markers, license plate lamps, trunk lamps, headlights, and tail lights.

Figure 3A:
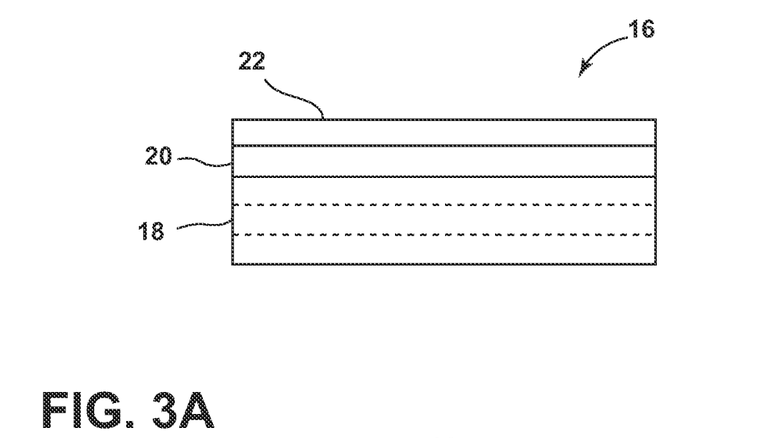
FIG. 3A illustrates a photoluminescent structure rendered as a coating.
Figure 3B:
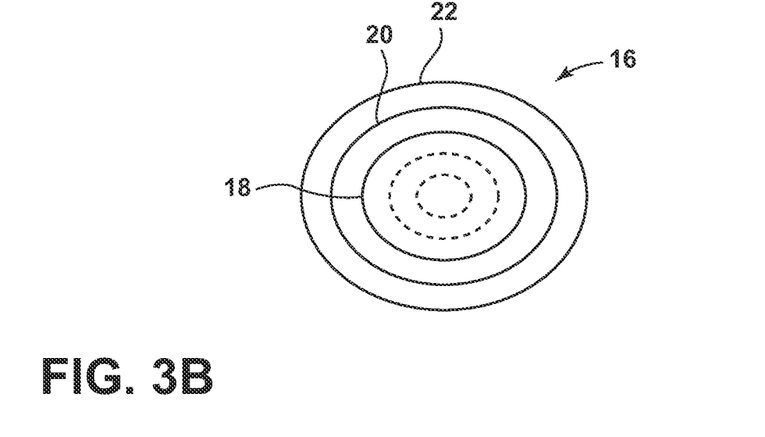
FIG. 3B illustrates the photoluminescent structure rendered as a discrete particle.
Figure 3C:
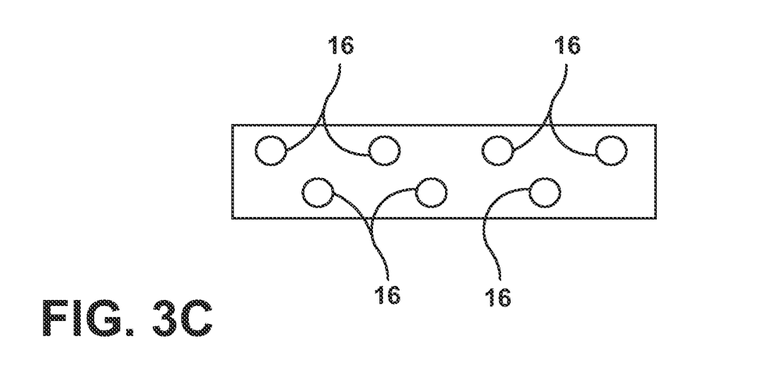
FIG. 3C illustrates a plurality photoluminescent structures rendered as discrete particles and incorporated into a separate structure.

Referring to FIGS. 3A-3C, a photoluminescent structure 16 is generally shown rendered as a coating (e.g. a film) capable of being applied to a vehicle fixture, a discrete particle capable of being implanted in a vehicle fixture, and a plurality of discrete particles incorporated into a separate structure capable of being applied to a vehicle fixture, respectively. At the most basic level, the photoluminescent structure 16 includes an energy conversion layer 18 that may be provided as a single layer or a multilayer structure, as shown through broken lines in FIGS. 3A and 3B. The energy conversion layer 18 may include one or more photoluminescent materials having energy converting elements selected from a phosphorescent or a fluorescent material and formulated to convert an inputted electromagnetic radiation into an outputted electromagnetic radiation generally having a longer wavelength and expressing a color that is not characteristic of the inputted electromagnetic radiation. The difference in wavelength between the inputted and outputted electromagnetic radiations is referred to as the Stokes shift and serves as the principle driving mechanism for the abovementioned energy conversion process, often referred to as down conversion.

The energy conversion layer 18 may be prepared by dispersing the photoluminescent material in a polymer matrix to form a homogenous mixture using a variety of methods. Such methods may include preparing the energy conversion layer 18 from a formulation in a liquid carrier medium and coating the energy conversion layer 18 to a desired planar and/or non-planar substrate of a vehicle fixture. The energy conversion layer 18 coating may be deposited on the selected vehicle fixture by painting, screen printing, spraying, slot coating, dip coating, roller coating, and bar coating. Alternatively the energy conversion layer 18 may be prepared by methods that do not use a liquid carrier medium. For example, a solid state solution (homogenous mixture in a dry state) of one or more photoluminescent materials in a polymer matrix may be converted to the energy conversion layer 18 by extrusion, injection molding, compression molding, calendaring, and thermoforming. In instances where one or more energy conversion layers 18 are rendered as particles, the single or multi-layered energy conversion layers 18 may be implanted into the chosen vehicle fixture instead of applying it as a coating. When the energy conversion layer 18 includes a multilayer formulation, each layer may be sequentially coated, or the layers can be separately prepared and later laminated or embossed together to form an integral layer. Alternatively, the layers may be coextruded to prepare an integrated multi-layered energy conversion structure.

Referring back to FIGS. 3A and 3B, the photoluminescent structure 16 may optionally include at least one stability layer 20 to protect the photoluminescent material contained within the energy conversion layer 18 from photolytic and thermal degradation to provide sustained emissions of outputted electromagnetic radiation. The stability layer 20 may be configured as a separate layer and is optically coupled and adhered to the energy conversion layer 18 or otherwise integrated with the energy conversion layer 18 provided a suitable polymer matrix is selected. The photoluminescent structure 16 may also optionally include a protection layer 22 optically coupled and adhered to the stability layer 20 or other layer to protect the photoluminescent structure 16 from physical and chemical damage arising from environmental exposure.

The stability layer 20 and/or the protective layer 22 may be combined with the energy conversion layer 18 to form an integrated photoluminescent structure 16 through sequential coating or printing of each layer, or by sequential lamination or embossing. Alternatively, several layers may be combined by sequential coating, lamination, or embossing to form a substructure, and the required substructure then laminated or embossed together to form the integrated photoluminescent structure 16. Once formed, the photoluminescent structure 16 may be applied to a chosen vehicle fixture. Alternatively, the photoluminescent structure 16 may be incorporated into the chosen vehicle fixture as one or more discrete multilayered particles. Alternatively still, the photoluminescent structure 16 may be provided as one or more discrete multilayered particles dispersed in a polymer formulation that is subsequently applied to the chosen vehicle fixture as a contiguous structure. Additional information regarding the construction of photoluminescent structures is disclosed in U.S. Pat. No. 8,232,533 entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Figure 4:
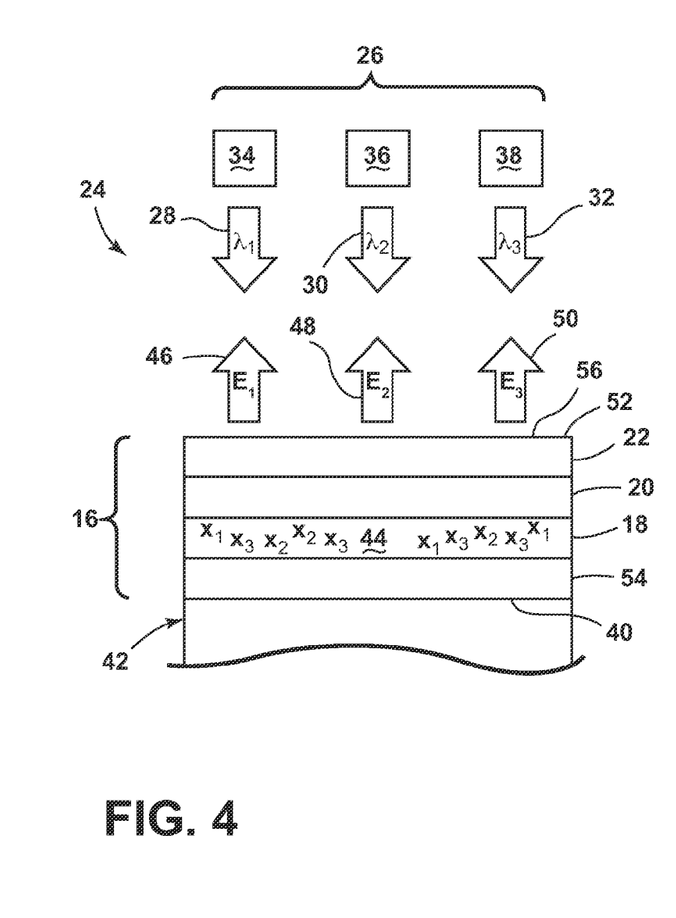
FIG. 4 illustrates a vehicle lighting system employing a front-lit configuration.
Figure 5:
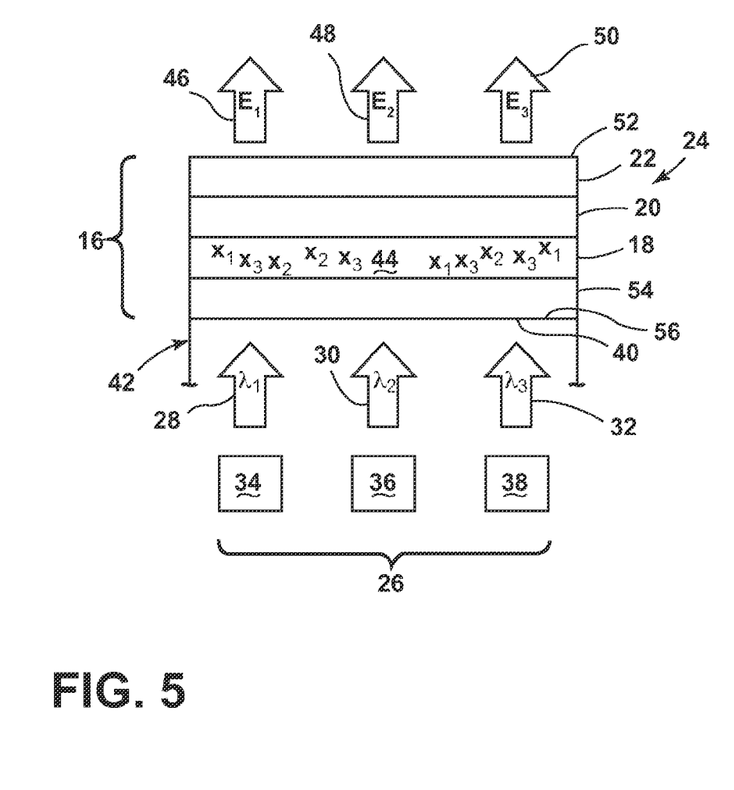
FIG. 5 illustrates the vehicle lighting system employing a backlit configuration.

Referring to FIGS. 4 and 5, a vehicle lighting system 24 is generally shown according to a front-lit configuration (FIG. 4) and a backlit configuration (FIG. 5). In both configurations, the vehicle lighting system 24 includes a photoluminescent structure 16 rendered as a coating and applied to a substrate 40 of a vehicle fixture 42. The photoluminescent structure 16 includes an energy conversion layer 18 and optionally includes a stability layer 20 and/or a protective layer 22, as described previously. The energy conversion layer 18 includes a red-emitting photoluminescent material $X_1$, a green-emitting photoluminescent material $X_2$, and a blue-emitting photoluminescent material $X_3$ dispersed in a polymer matrix 44. The red, green, and blue-emitting photoluminescent materials $X_1$, $X_2$, and $X_3$ are chosen because varying mixtures of red, green, and blue light will enable a variety of color sensations to be duplicated. As further described below, an excitation source 26 is operable to excite each of the red, green, and blue-emitting photoluminescent materials $X_1$, $X_2$, and $X_3$ in various combinations to produce different colored light, which is allowed to escape from the photoluminescent structure 16 to provide ambient or task lighting.

The excitation source 26 is generally shown in an external location relative to the photoluminescent structure 16 and is operable to emit a primary emission having a light content defined by a first inputted electromagnetic radiation represented as directional arrow 28, a second inputted electromagnetic radiation represented as directional arrow 30, and/or a third inputted electromagnetic radiation represented as directional arrow 32. The contribution of each inputted electromagnetic radiation 28, 30, 32 in the primary emission depends on an activation state of a corresponding light emitting diode (LED) configured to output light at a unique peak wavelength. In both configurations, the first inputted electromagnetic radiation 28 is emitted from blue LED 34 at a peak wavelength $\lambda_1$ selected from a blue spectral color range, which is defined herein as the range of wavelengths generally expressed as blue light (~450-495 nanometers). The second inputted electromagnetic radiation 30 is emitted from blue LED 36 at a peak wavelength $\lambda_2$ also selected from the blue spectral color range and the third inputted electromagnetic radiation 32 is emitted from blue LED 38 at a peak wavelength $\lambda_3$ further selected from the blue spectral color range.

By virtue of peak wavelengths $\lambda_1$, $\lambda_2$, and $\lambda_3$ having different lengths, blue LEDs 34, 36, and 38 may each be primarily responsible for exciting one of the red, green, and blue-emitting photoluminescent materials $X_1$, $X_2$, $X_3$. Specifically, blue LED 34 is primarily responsible for exciting the red-emitting photoluminescent material $X_1$, blue LED 36 is primarily responsible for exciting the green-emitting photoluminescent material $X_2$, and blue LED 38 is primarily responsible for exciting the blue-emitting photoluminescent material $X_3$. For more efficient energy conversion, the red-emitting photoluminescent material $X_1$ is selected to have a peak absorption wavelength corresponding to the peak wavelength $\lambda_1$ associated with the first inputted electromagnetic radiation 28. When excited, the red-emitting photoluminescent material $X_1$ converts the first inputted electromagnetic radiation 28 into a first outputted electromagnetic radiation represented as directional arrow 46 and having a peak emission wavelength $E_1$ that includes a wavelength of a red spectral color range, which is defined herein as the range of wavelengths generally expressed as red light (~620-750 nanometers). Likewise, the green-emitting photoluminescent material $X_2$ is selected to have a peak absorption wavelength corresponding to the peak wavelength $\lambda_2$ of the second inputted electromagnetic radiation 30. When excited, the green-emitting photoluminescent material $X_2$ converts the second electromagnetic radiation 30 into a second outputted electromagnetic radiation represented as directional arrow 48 and having a peak emission wavelength $E_2$ that includes a wavelength of a green spectral color range, which is defined herein as the range of wavelengths generally expressed as green light (~526-606 nanometers). Lastly, the blue-emitting photoluminescent material $X_3$ is selected to have a peak absorption wavelength corresponding to the peak wavelength $\lambda_3$ of the third inputted electromagnetic radiation 32. When excited, the blue-emitting photoluminescent material $X_3$ converts the third inputted electromagnetic radiation 32 into a third outputted electromagnetic radiation represented as arrow 50 and having a peak emission wavelength $E_3$ that includes a longer wavelength of the blue spectral color range.

Given the relatively narrow band of the blue spectral color range, it is recognized that some spectral overlap may occur between the absorption spectrums of the red, green, and blue-emitting photoluminescent materials $X_1$, $X_2$, $X_3$. This may result in the inadvertent excitement of more than one of the red, green, and blue-emitting photoluminescent materials $X_1$, $X_2$, $X_3$ despite only one of the blue LEDs 34, 36, 38 being active, thereby producing unexpected color mixtures. Thus, if desiring greater color separation, the red, green, and blue-emitting photoluminescent materials $X_1$, $X_2$, $X_3$ should be selected to have narrow band absorption spectrums for minimizing any spectral overlap therebetween and peak wavelengths $\lambda_1$, $\lambda_2$, and $\lambda_3$ should be spaced apart to enable sufficient separation between the peak absorption wavelengths of the red, green, and blue-emitting photoluminescent materials $X_1$, $X_2$, $X_3$. In this manner, depending on which of the red, green, and blue-emitting photoluminescent materials $X_1$, $X_2$, $X_3$ are excited, a secondary emission having a more predictable light content may be produced. The secondary emission may express a variety of colors found in a typical RGB color space, including colors that are predominately red, green, blue, or any combination thereof. For example, when blue LEDs 34, 36, and 38 are activated simultaneously, the secondary emission may contain an additive light mixture of red, green, and blue light, which is generally perceived as white light. Other color sensations found in the RGB color space may be produced by activating blue LEDs 34, 36, and 38 in different combinations and/or changing the output intensity associated with the blue LEDs 34, 36, 38 through current control, pulsewidth modulation (PWM), or other means.

Regarding the vehicle lighting system 24 disclosed herein, blue LEDs 34, 36, and 38 are chosen as the excitation source 26 to take advantage of the relative cost benefit attributed therewith when used in vehicle lighting applications. Another advantage of using blue LEDs 34, 36, and 38 is the relatively low visibility of blue light, which may present less of a distraction to a vehicle driver and other occupants in instances where the primary emission must propagate in plain view before reaching the photoluminescent structure 16. Nevertheless, it should be appreciated that the vehicle lighting system 24 may also be implemented using other lighting devices as well as sunlight and/or ambient light. Furthermore, given the range of vehicle fixtures capable of receiving the photoluminescent structure 16, it should also be appreciated that the location of the excitation source 26 will naturally vary depending on the makeup of a particular vehicle fixture and may be external or internal to the photoluminescent structure 16 and/or the vehicle fixture. It should further be appreciated that the excitation source 26 may provide the primary emission directly or indirectly to the photoluminescent structure 16. That is, the excitation source 26 may be positioned such that the primary emission propagates towards the photoluminescent structure 16 or positioned such that the primary emission is distributed to the photoluminescent structure 16 via a light pipe, optical device, or the like.

The energy conversion process used by each of the red, green, and blue-emitting photoluminescent materials $X_1$, $X_2$, $X_3$ described above may be variously implemented given the wide selection of energy conversion elements available. According to one implementation, the energy conversion process occurs through a single absorption/emission event driven by one energy conversion element. For instance, the red-emitting photoluminescent material $X_1$ may include a phosphor exhibiting a large Stokes shift for absorbing the first inputted electromagnetic radiation 28 and subsequently emitting the first outputted electromagnetic radiation 46. Likewise, the green-emitting photoluminescent material $X_2$ may also include a phosphor exhibiting a large Stokes shift for absorbing the second inputted electromagnetic radiation 30 and emitting the second outputted electromagnetic radiation. One benefit of using a phosphor or other energy conversion element exhibiting a large Stokes shift is that greater color separation may be achieved between an inputted electromagnetic and an outputted electromagnetic radiation due to a reduction in spectral overlap between the corresponding absorption and emission spectrums. Similarly, by exhibiting a single Stokes shift, the absorption and/or emission spectrums for a given photoluminescent material are less likely to have spectral overlap with the absorption and/or emission spectrums of another photoluminescent material thereby providing greater color separation between the selected photoluminescent materials.

According to another implementation, the energy conversion process occurs through an energy cascade of absorption/emission events driven by a plurality of energy conversion elements with relatively shorter Stokes shifts. For example, the red-emitting photoluminescent material $X_1$ may contain fluorescent dyes, whereby some or all of the first inputted electromagnetic radiation 28 is absorbed to emit a first intermediate electromagnetic radiation having a longer wavelength and a color that is not characteristic of the first inputted electromagnetic radiation 28. The first intermediate electromagnetic radiation is then absorbed a second time to emit a second intermediate electromagnetic radiation having yet a longer wavelength and a color that is not characteristic of the first intermediate electromagnetic radiation. The second intermediate electromagnetic radiation may be further converted with additional energy conversion elements exhibiting the appropriate Stokes shifts until the desired peak emission wavelength $E_1$ associated with the first outputted electromagnetic radiation 46 is obtained. A similar energy conversion process may also be observed for the green-emitting photoluminescent material $X_2$. While energy conversion processes implementing energy cascades may produce broad color spectrums, increasing the number of Stokes shifts may result in less efficient down conversions due to a greater likelihood of spectral overlap between the associated absorption and emission spectrums. In addition, if desiring greater color separation, additional consideration should be exercised such that the absorption and/or emission spectrums of a photoluminescent material have minimal overlap with the absorption and/or emission spectrums of another photoluminescent material also implementing an energy cascade or some other energy conversion process.

Regarding the blue-emitting photoluminescent material $X_3$, successive conversions of the third inputted electromagnetic radiation 32 via an energy cascade are unlikely to be necessary since the inputted electromagnetic radiation 32 and the outputted electromagnetic radiation 50 are both predisposed to have relatively close peak wavelengths in the blue spectral color range. Thus, the blue photoluminescent material $X_3$ may include an energy conversion element exhibiting a small Stokes shift. If desiring greater color separation, the blue photoluminescent material $X_3$ should be selected with an emission spectrum having minimal spectral overlap with the absorption spectrums of the red and green-emitting photoluminescent materials $X_1$, $X_2$. Alternatively, an ultraviolet LED may replace blue LED 38 to enable an energy conversion element exhibiting a larger Stokes shift to be used and to provide more flexible spacing opportunities for the emission spectrum of the blue-emitting photoluminescent material $X_3$ within the blue spectral color range. For front-lit configurations, the photoluminescent structure 16 may alternatively include a narrowband reflective material configured to reflect the third inputted electromagnetic radiation 32 emitted from blue LED 38 in lieu of performing an energy conversion thereto to express blue light, which obviates the need for including the blue-emitting photoluminescent material $X_3$. Alternatively, the aforementioned reflective material may be configured to reflect a selected amount of the first and second inputted electromagnetic radiations 28, 30 to express blue light, thereby obviating the need for including the blue-emitting photoluminescent material $X_3$ and blue LED 38. For back-lit configurations, blue light may alternatively be expressed by merely relying on some amount of the third inputted electromagnetic radiation 32 passing through the photoluminescent structure 16, wherein the blue-emitting photoluminescent material $X_3$ has been omitted.

Since many energy conversion elements are Lambertian emitters, the resulting secondary emissions may be propagated in all directions, including directions pointing away from a desired output surface 52 of the photoluminescent structure 16. As a result, some or all of the secondary emissions may be trapped (total internal reflection) or absorbed by corresponding structures (e.g. the vehicle fixture 42), thereby reducing the luminosity of the photoluminescent structure 16. To minimize the aforementioned phenomenon, the photoluminescent structure 16 may optionally include at least one wavelength-selective layer 54 formulated to redirect (e.g. reflect) wayward propagating secondary emissions towards the output surface 52, which also behaves as an input surface 56 with respect to front-lit configuration shown in FIG. 4. In instances where the input surface 56 and output surface 52 are different, as generally shown by the backlit configuration in FIG. 5, the wavelength-selective layer 54 should readily transmit any primary emissions and redirect any wayward propagating secondary emissions towards the output surface 52.

In both configurations, the wavelength-selective layer 54 is positioned between the substrate 40 and the energy conversion layer 18 so that at least some secondary emissions propagating towards the substrate 40 are redirected towards the output surface 52 to maximize the output of the secondary emission from the photoluminescent structure 16. To this end, the wavelength-selective layer 54 should at the very least be prepared from materials that scatter, but do not absorb, the peak emission wavelengths $E_1$, $E_2$, $E_3$ associated with the first, second, and third outputted electromagnetic radiations 46, 48, 50, respectively. The wavelength-selective layer 54 may be rendered as a coating and is optically coupled to the energy conversion layer 18 and adhered to both the energy conversion layer 18 and the substrate 40 using some of the previously described methods, or other suitable methods.

Figure 6:
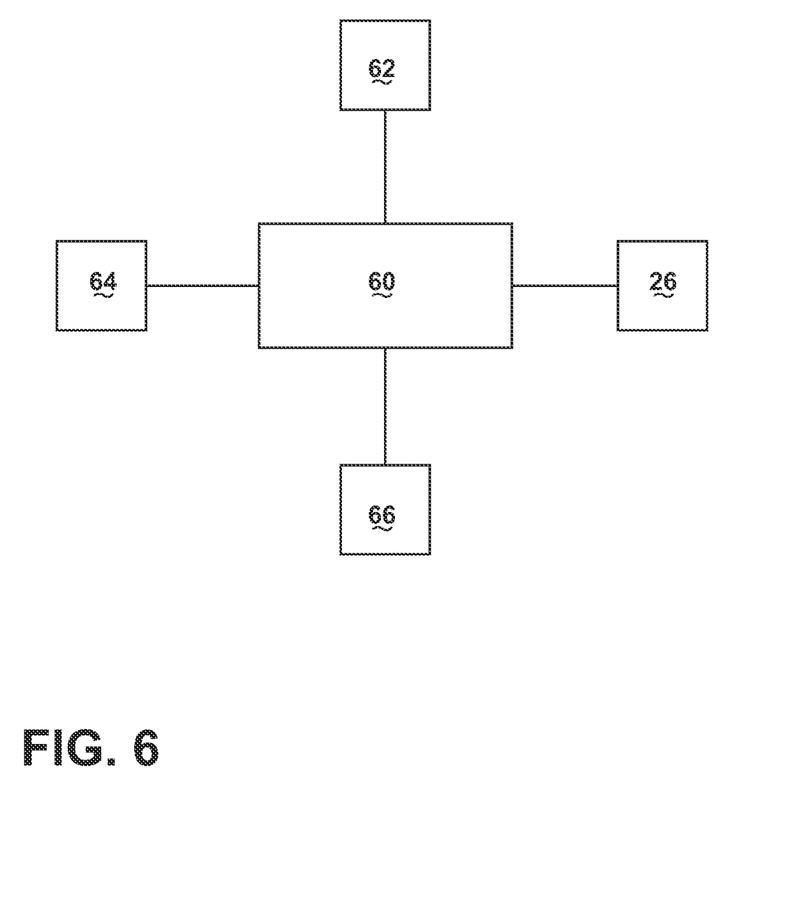
FIG. 6 illustrates a control system of the vehicle lighting system.

Referring to FIG. 6, the excitation source 26 may be electrically coupled to a processor 60, which provides power to the excitation source 26 via a power source 62 (e.g. onboard vehicle power supply) and controls the operational state of the excitation source and/or the intensity levels of the primary emission of the excitation source 26. Control instructions to the processor 60 may be executed automatically from a program stored within memory. Additionally or alternatively, control instructions may be provided from a vehicle device or system via at least one input 64. Additionally or alternatively still, control instructions may be provided to the processor 60 via any conventional user input mechanism 66, such as, but not limited to, push button, switches, touchscreens, and the like. While the processor 60 is shown electrically coupled to one excitation source 26 in FIG. 6, it should be appreciated that the processor 60 may also be configured to control additional excitation sources using any of the methods described above.

Figure 7:
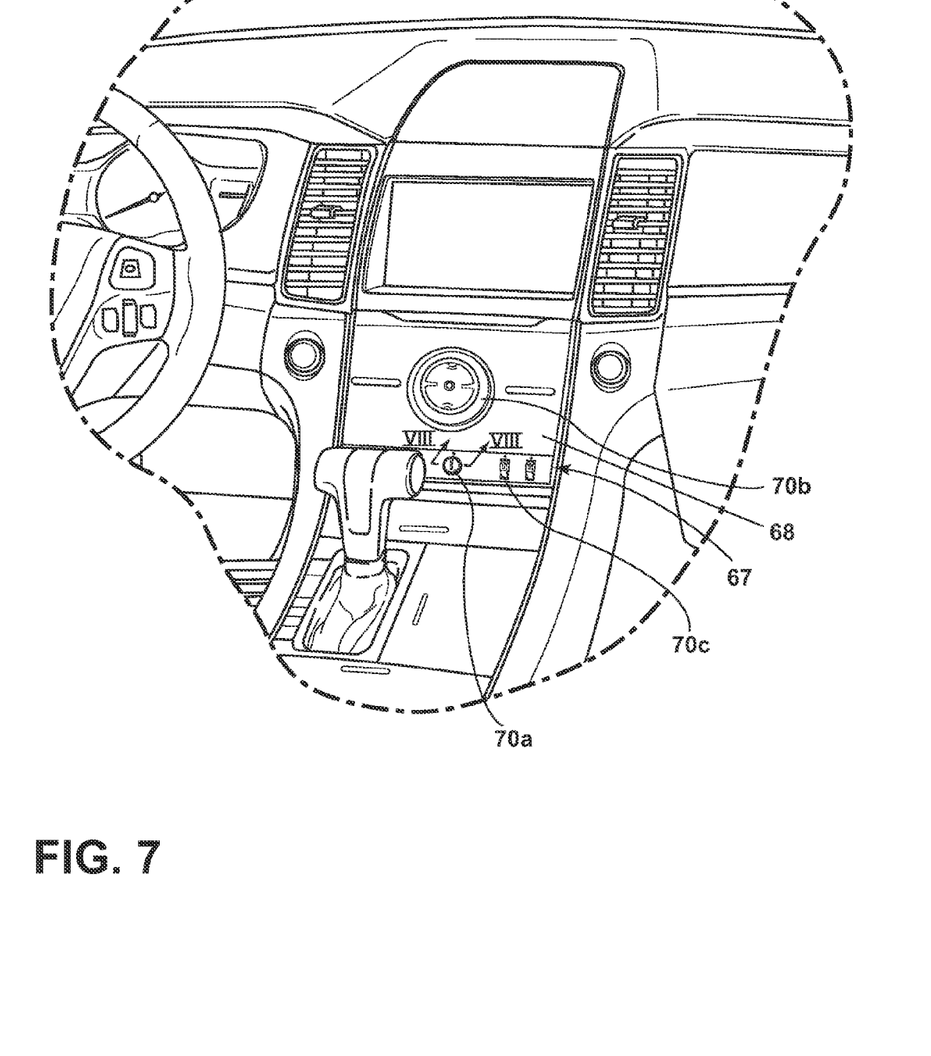
FIG. 7 illustrates a backlit assembly provided in a center console of an automotive vehicle.
Figure 8:
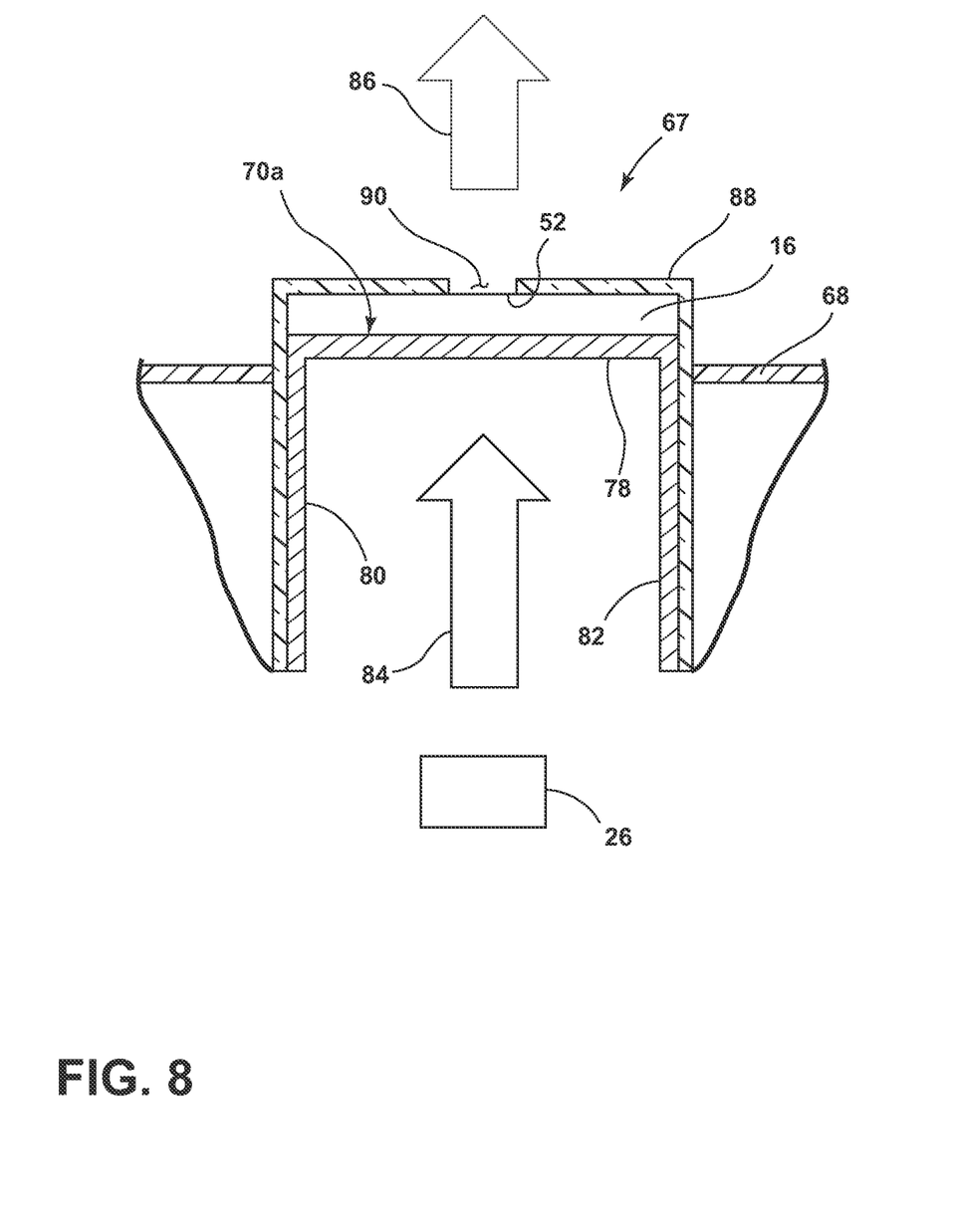
FIG. 8 illustrates a cross sectional view of a backlit interactive member taken along lines VIII-VIII of FIG. 7.

Referring to FIGS. 7 and 8, a backlit assembly 67 is generally shown and will be described herein as incorporating the vehicle lighting system 24 in a backlit configuration described previously with reference to FIG. 5 and may employ any alternative configurations associated therewith. As shown in FIG. 7, the backlit assembly 67 is exemplarily provided as a center console having a support member 68 (e.g. a trimplate) supporting one or more backlit interactive members, indicated by reference numerals 70a, 70b, and 70c. For purposes of illustration, the backlit interactive members 70a, 70b, 70c are embodied as a push button, a rotary knob, and a toggle switch, respectively, each configurable to enable a user to interface with one or more vehicle features such as an audio system, a climate control system, a navigation system, etc.

Referring to FIG. 8, a cross sectional view of backlit interactive member 70a is shown according to one embodiment. With respect to the illustrated embodiment, backlit interactive member 70a at least partially extends through an opening formed in the support member 68 and may be mounted in the backlit assembly 67 in any conventional manner. The backlit interactive member 70a may include a light conducting body having a front side 78 and at least one sidewall 80, and may be formed through injection molding or other suitable methods. While the backlit interactive member 70a is embodied as a push button in FIG. 8, it should be appreciated that other embodiments are also possible such as a rotary knob, a toggle switch, or the like.

According to the present embodiment, the excitation source 26 is positioned to provide a primary emission in the form of backlighting, as represented by directional arrow 84 to the backlit interactive member 70a. The primary emission 84 may be provided directly from the excitation source 26 or indirectly via a light pipe, optical device, or the like and may contain one or more inputted electromagnetic radiations, each having a uniquely associated peak wavelength and each being emitted from a corresponding LED.

The primary emission 84 is supplied to the front side 78 of the backlit interactive member 70a and is transmitted therethrough. The primary emission 84 is then received in the photoluminescent structure 16, which may convert substantially all of the primary emission into a secondary emission containing one or more outputted electromagnetic radiations, each having a uniquely associated peak emission wavelength. Alternatively, the photoluminescent structure 16 may convert some of the primary emission into the secondary emission and transmit the rest as an unconverted outputted electromagnetic radiation. In any event, one or more outputted electromagnetic radiations, collectively represented by arrow 86, exit through the output surface 52 of the photoluminescent structure 16 and express a color sensation found in an RGB color space.

To bolster the luminosity of the photoluminescent structure 16, a wavelength-selective layer 54 may be provided therein for redirecting any backscattered secondary emissions 86 towards the output surface 52. Optionally, an opaque layer 88 is coupled to at least the photoluminescent structure 16 and defines an opening 90 that is characteristic of an insignia through which the secondary emission 86 is transmitted, thereby illuminating the insignia.

Figure 9:
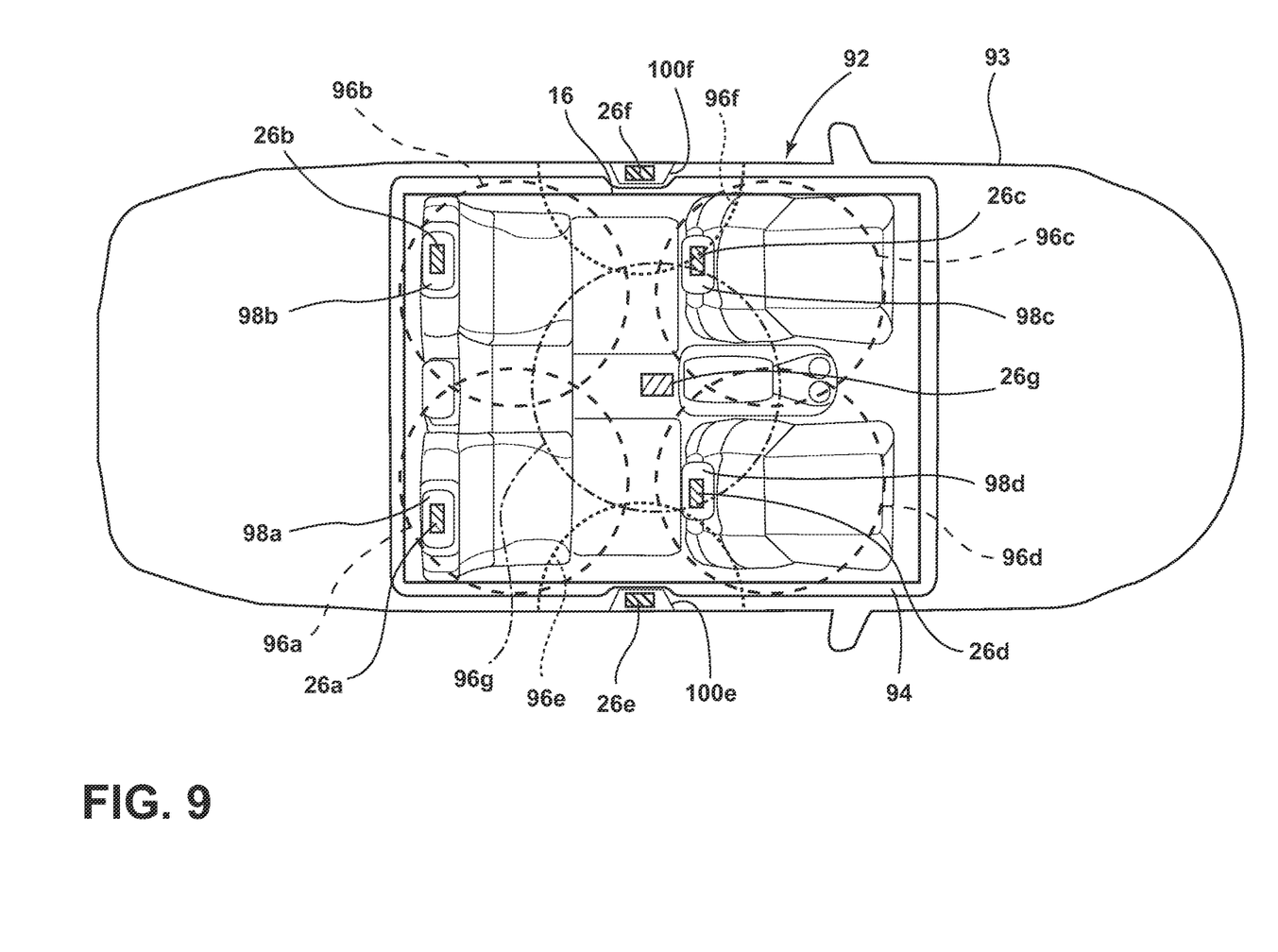
FIG. 9 illustrates a schematic diagram of a vehicle dome lighting system.

Referring to FIG. 9, a schematic diagram is shown for implementing a vehicle dome lighting system 92 in a vehicle 93. The vehicle dome lighting system 92 incorporates the vehicle lighting system 24 in a front-lit configuration as described previously in reference to FIG. 4 and may employ any alternative configurations associated therewith. As shown in FIG. 9, the photoluminescent structure 16 is contiguously coupled to a vehicle headliner 94 and a plurality of excitation sources 26a-26g are each positioned to emit a primary emission towards an associated area 96a-96g of the photoluminescent structure 16. The primary emission emitted from any given excitation source 26a-26g may contain one or more inputted electromagnetic radiations, each having a uniquely associated peak wavelength and each being emitted from a corresponding LED. As previously described, the photoluminescent structure 16 may convert substantially all of the primary emission into a secondary emission containing one or more outputted electromagnetic radiations, each having a uniquely associated peak emission wavelength. Alternatively, the photoluminescent structure 16 may reflect some of the primary emission and convert the rest into the secondary emission and reflect. In either configuration, the photoluminescent structure 16 may optionally include the wavelength-selective layer 54 for redirecting any backscattered secondary emission to bolster the luminosity of the photoluminescent structure 16.

In the illustrated embodiment, excitation sources 26a-26d are each operably coupled to an associated headrest 98a-98d and optically configured to illuminate a corresponding corner area 96a-96d of the photoluminescent structure 16 in a generally circular pattern. Excitation sources 26e and 26f are each optically coupled to an associated b-pillar 100e, 100f and are each optically configured to illuminate a corresponding side area 96e, 96f of the photoluminescent structure 16 in a generally half-circular pattern. Lastly, excitation source 26g is operably coupled to the vehicle headliner 94 and optically configured to illuminate a corresponding central area 96g in a generally circular pattern. As can be seen in FIG. 9, such an arrangement provides the opportunity for overlap between associated areas 96a-96g that are adjacent to one another, thereby covering a substantial total area of the photoluminescent structure 16. As such, the vehicle dome lighting system 92 may be controlled (e.g. via processor 60) to provide a total or isolated lighting experience by activating all or some of the excitation sources 26a-26g. Additionally or alternatively, the use of multiple excitation sources 26a-26g, enables any given associated area 96a-96g of the photoluminescent structure 16 to produce a color sensation (composed of outputted electromagnetic radiation and/or reflected inputted electromagnetic radiation) found in an RGB color space that is similar or different to the color sensation produced by any other associated area 96a-96g. This may be achieved by manipulating the light content of the primary emission emitted from any active excitation source 26a-26g.

Accordingly, a vehicle lighting system 24 has been described herein. The vehicle lighting system 24 advantageously employs a photoluminescent structure 16 capable of converting a primary emission into a secondary emission to provide a variety of color sensations, thereby enhancing a driving experience and/or general appearance of a vehicle fixture.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:
1. A vehicle dome lighting system comprising:
a headliner coupled to a vehicle roof structure;

a photoluminescent structure contiguously coupled to the headliner; and a plurality of excitation sources, each operably coupled to one of a headrest, a b-pillar, and the headliner, and operable to emit a primary emission to excite an associated area of the photoluminescent structure, wherein each associated area is formulated to convert the primary emission into a secondary emission and is located in one of a corner area, a side area, and a central area of the photoluminescent structure such that each associated area at least partially overlaps with at least one adjacent associated area.

2. The vehicle dome lighting system of claim 1, wherein each excitation source comprises a first blue light emitting diode, a second blue light emitting diode, and a third blue light emitting diode, each operable to output a uniquely associated peak wavelength of blue light.

3. The vehicle dome lighting system of claim 2, wherein the primary emission comprises at least one of a first inputted electromagnetic radiation emitted from the first blue light emitting diode, a second inputted electromagnetic radiation emitted from the second blue light emitting diode, and a third inputted electromagnetic radiation emitted from the third blue light emitting diode.

4. The vehicle dome lighting system of claim 3, wherein the photoluminescent structure comprises an energy conversion layer having a red-emitting photoluminescent material that is primarily excited by the first inputted electromagnetic radiation, a green-emitting photoluminescent material that is primarily excited by the second inputted electromagnetic radiation, and a blue-emitting photoluminescent material that is primarily excited by the third blue light emitting diode.

5. The vehicle dome lighting system of claim 4, wherein the secondary emission comprises at least one of a first outputted electromagnetic radiation, a second outputted electromagnetic radiation, and a third outputted electromagnetic radiation, each having a uniquely associated peak emission wavelength.

6. The vehicle dome lighting system of claim 5, wherein the red-emitting photoluminescent material converts the first inputted electromagnetic radiation into the first outputted electromagnetic radiation, the green-emitting photoluminescent material converts the second inputted electromagnetic radiation into the second outputted electromagnetic radiation, and the blue-emitting photoluminescent material converts the third inputted electromagnetic radiation into the third outputted electromagnetic radiation.

7. A vehicle dome lighting system comprising:
a headliner coupled to a vehicle roof structure;
a photoluminescent structure coupled to the headliner; and
a plurality of excitation sources, each operable to emit at least one of a first inputted electromagnetic radiation, a second inputted electromagnetic radiation, and a third inputted electromagnetic radiation for exciting an associated area of the photoluminescent structure, wherein each associated area contains a red-emitting photoluminescent material formulated to convert the first inputted electromagnetic radiation into a first outputted electromagnetic radiation, a green-emitting photoluminescent material formulated to convert the second inputted electromagnetic radiation into a second outputted electromagnetic radiation, and a blue-emitting photoluminescent material formulated to convert the third inputted electromagnetic radiation into a third outputted electromagnetic radiation.

8. The vehicle dome lighting system of claim 7, wherein the plurality of excitation sources are each operably coupled to one of a headrest, a b-pillar, and the headliner.

9. The vehicle dome lighting system of claim 7, wherein each associated area is located in one of a corner area, a side area, and a central area of the photoluminescent structure and at least partially overlaps with at least one adjacent associated area.

10. The vehicle dome lighting system of claim 7, wherein the first, second, and third inputted electromagnetic radiations each have a uniquely associated peak wavelength.

11. The vehicle dome lighting system of claim 10, wherein the first, second, and third inputted electromagnetic radiations are each expressed as blue light.

12. The vehicle dome lighting system of claim 7, wherein the first, second, and third outputted electromagnetic radiations each have a uniquely associated peak emission wavelength.

13. A vehicle dome lighting system comprising:
a headliner coupled to a vehicle roof structure;
a photoluminescent structure coupled to the headliner; and
excitation sources operable to emit a plurality of inputted electromagnetic radiation, at least a portion of which have a uniquely associated peak wavelength, the photoluminescent structure configured to convert the plurality of inputted electromagnetic radiation into a plurality of outputted electromagnetic radiation, each having a uniquely associated peak emission wavelength outputted electromagnetic radiation.

14. The vehicle dome lighting system of claim 13, wherein each of the excitation sources are operably coupled to one of a headrest, a b-pillar, and the headliner.

15. The vehicle dome lighting system of claim 13, wherein each excitation source excites an associated area of the photoluminescent structure, wherein the associated area comprises one of a corner area, a side area, and a central area of the photoluminescent structure and overlaps with at least one adjacent associated area.

16. The vehicle dome lighting system of claim 13, wherein the photoluminescent structure is configured to reflect at least one of the plurality of inputted electromagnetic radiation.

17. The vehicle dome lighting system of claim 13, wherein the photoluminescent structure is configured to reflect a portion of at least one of the plurality of inputted electromagnetic radiation and convert a remainder of the at least one of the plurality of inputted electromagnetic radiation.

18. The vehicle dome lighting system of claim 13, wherein each of the plurality of inputted electromagnetic radiation is emitted from one of a blue light emitting diode and an ultraviolet light emitting diode.

* * * * *

UNITED STATES PATENT AND TRADEMARK OFFICE
CERTIFICATE OF CORRECTION

PATENT NO. : 9,440,583 B2  
APPLICATION NO. : 14/156869  
DATED : September 13, 2016  
INVENTOR(S) : Stuart C. Salter et al.

Page 1 of 1

It is certified that error appears in the above-identified patent and that said Letters Patent is hereby corrected as shown below:

In the Claims  
Column 12, Claim 13, Line 36:  
After "length" delete "outputted electromagnetic radiation".

Signed and Sealed this  
Third Day of January, 2017

Michelle K. Lee  
*Director of the United States Patent and Trademark Office*